United States Patent [19]

Gonzalez et al.

[11] Patent Number: 4,596,665

[45] Date of Patent: Jun. 24, 1986

[54] FLEXIBLE POLYMER FOAMS PREPARED WITH $C_4$ OR HIGHER POLYETHERS AS CELL OPENERS

[75] Inventors: Ana X. Gonzalez; Patricia A. Engelking; John F. Serratelli, all of Lake Jackson, Tex.

[73] Assignee: The Dow Chemical Company, Midland, Mich.

[21] Appl. No.: 674,381

[22] Filed: Nov. 23, 1984

[51] Int. Cl.[4] .......................... C09K 3/00; H05B 33/00
[52] U.S. Cl. ..................................... 252/182; 521/167; 521/173; 521/174; 521/176
[58] Field of Search ............... 521/173, 174, 176, 167; 252/182

[56] References Cited

U.S. PATENT DOCUMENTS

| | | | |
|---|---|---|---|
| 4,088,614 | 5/1978 | Mori et al. | 521/173 |
| 4,201,379 | 5/1977 | Chaya et al. | 521/173 |
| 4,374,935 | 2/1983 | Decker et al. | 521/173 |

*Primary Examiner*—Morton Foelak
*Attorney, Agent, or Firm*—G. C. Cohn

[57] ABSTRACT

Polyethers which are polymers of $C_4$ or higher oxiranes are used as cell openers in preparing flexible polymer foams. These cell openers provide processing advantages, do not bleed out of the forms, and are often effective at lower levels of use than conventional cell openers.

10 Claims, No Drawings

FLEXIBLE POLYMER FOAMS PREPARED WITH C₄ OR HIGHER POLYETHERS AS CELL OPENERS

BACKGROUND OF THE INVENTION

This invention relates to active hydrogen containing compositions useful in preparing polyurethane polymers, particularly low resiliency polyurethane foams.

In preparing flexible polyurethane and/or polyurea foams, it is necessary that the polymer foam be open-celled. The presence of closed cells substantially reduces the dimensional stability and flexibility of the foam while increasing the rigidity and brittleness. Since high flexibility and dimensional stability are essential properties of these foams, the foam formulation and/or processing conditions must be such to promote the formation of open-cells.

Various additives which promote cell-opening are known. For example, the so-called polymer polyols (also copolymer polyols) are sometimes used in polyurethane foam formulations to promote cell opening. However, polymer polyols are not generally useful for preparing low resiliency foams.

Polyolefins, particularly polybutene, and waxy aliphatic hydrocarbons such as paraffin oil are the most commonly employed cell openers in low resiliency foams. Unfortunately, these materials are incompatible with the reactants used in making the foam or with the product foam itself. This incompatibility leads to several problems. The polyolefin or waxy hydrocarbon cannot be formulated into the polyol or polyisocyanate blends used to prepare the foam, since it will rapidly phase separate. Thus, these cell openers must be metered separately into the foam formulation simultaneously with or immediately prior to start of the foaming reaction. In addition, since these cell openers are incompatible with the product foam, they tend to leach out of the foam with time.

Another problem with conventional cell openers is the amount required to be effective. Since these cell openers do not contribute to the overall properties of the foam, except to open cells, it is desirable to reduce, the required amount of cell opener, whenever possible.

The production of low resiliency foams provides additional problems. Low resiliency foams are generally prepared using polyols of moderate (i.e. 500–1200) molecular weight rather than the higher molecular weight polyols used in higher resiliency foams. In reacting with a polyisocyanate, the moderate molecular weight polyols form cells which are more difficult to open than those prepared from higher molecular weight polyols. Thus, the preparation of low resiliency foams particularly requires an especially effective cell opener.

Accordingly, it would be desirable to provide a cell opening additive which is compatible with the reactants used in preparing flexible foam and/or the foam itself. Preferably, such cell opening additive is one which is effective at relatively low levels of use. In addition, it would be desirable to provide a cell opening additive which is suitable for use in preparing low resiliency foams.

SUMMARY OF THE INVENTION

This invention is in one aspect an active hydrogen-containing composition comprising:

(a) a major portion of a moderate or high equivalent weight polyahl,
(b) a minor portion of a polymer of an α,β-alkylene oxide having at least 4 carbon atoms which polymer has a molecular weight of at least about 500.

In another aspect, this invention is a flexible foam prepared by the reaction of the aforementioned active hydrogen-containing composition, a blowing agent and a polyisocyanate.

In yet another aspect, this invention is an improvement in a process for preparing a polyurethane and/or polyurea foam comprising reacting a reaction mixture comprising a moderate or high molecular weight polyahl, a blowing agent and a polyisocyanate. The improvement which is this invention comprises employing in said reaction mixture a minor amount of a polymer of an α,β-alkylene oxide having at least 4 carbon atoms which polymer has a molecular weight of at least about 500.

DETAILED DESCRIPTION OF THE INVENTION

A polyether having a molecular weight of at least about 500, which is a polymer of an α,β-alkylene oxide having at least 4 carbon atoms, is employed in this invention. This polymer is referred sometimes to herein by the term "cell-opener".

Suitable cell openers include polymers of oxiranes represented by the general formula

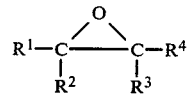

wherein each of R¹-R⁴ is independently hydrogen, halogen, inertly substituted hydrocarbyl or alkoxyl provided that the groups R¹-R⁴ together contain at least two carbon atoms. Preferably, R¹, R² and R³ are hydrogen and R⁴ is inertly substituted alkyl or alkoxyl. More preferably, R⁴ contains from about 2–12, especially 2–6 carbon atoms. Exemplary alkylene oxides, include, for example, 1,2-butylene oxide, 2,3-butylene oxide, 1,2-pentylene oxide, 2,3-pentylene oxide, the diverse hexylene oxides, the diverse decylene oxides, styrene oxide, t-butyl glycidyl ether, ethyl glycidyl ether, n-propyl glycidyl ether and the like. In addition to the aforementioned alkylene oxides, inertly substituted derivatives thereof, i.e. those having no substituent groups which undesirably interfere with the function of the cell opener or the formation of a foam from the diverse components used in preparing the foam, are also useful. Exemplary inert substituent groups include halogen, ether, ester, amide, aromatic or aliphatic hydrocarbyl and like groups.

Most preferred are polymers of 1,2-butylene oxide and 2,3-butylene oxide.

Copolymers of the aforedescribed α,β-alkylene oxide and minor amounts (i.e. less than 50, preferably less than 25 mole percent) of other copolymerizable compounds, notably ethylene oxide and propylene oxide, are also useful herein.

The cell opener has an equivalent weight of at least 500, preferably at least about 1500, and more preferably at least about 2000. It has been found that higher equivalent weight cell openers are generally more effective at lower levels of use than are the lower equivalent weight materials.

The cell opener may contain one or more active hydrogen atoms which react with a polyisocyanate under the conditions of the foaming reaction to bind the polyether to the polymer structure. Generally, the cell opener used herein will contain from about 0-8 such active hydrogen atoms. Since the lower equivalent weight cell openers are generally required in greater amounts to be effective, it is generally preferred to use lower functional cell openers. It is difficult to prepare high equivalent weight, highly functional polyethers, and such materials are often viscous and difficult to handle. Therefore, it is preferred that the cell opener contain from about 1-3, preferably about 1 active hydrogen atom per molecule. For the purpose of this invention, the equivalent weight of a mono functional cell opener is considered to be equal to its molecular weight.

The cell opener is advantageously prepared by polymerizing the $\alpha,\beta$-alkylene oxide at elevated temperature and pressure in the presence of a catalyst and an initiator. Suitable processes are described by R. A. Newton, "Propylene Oxide Polymers and Higher 1,2-Epoxide Polymers", Kirk-Othmer Encyclopedia of Chemical Technology, Vol. 18, pages 633–645 (1982). Said initiator comprises a compound having one or more active hydrogen atoms which react with the cyclic ether-containing compound to form an ether. The initiator generally contains from about 1-8, preferably 1-3, more preferably about 1 such active hydrogen. Suitable initiators include water, ammonia, primary or secondary amines, alcohols, mercaptans and the like. Alcohols are generally preferred, particularly monoalcohols containing 1-22, preferably 4-16, carbon atoms.

The cell opener will generally have a functionality equal to the number of active hydrogens on the initiator. The amount may be reduced, if desired, by "capping" the polyether with a compound such as a monoacid, mono-isocyanate, aliphatic halide, allyl halide or benzyl halide which forms an organic end group which is not reactive with any component of the foam formulation. Acetic acid, benzoic acid, the so-called fatty acids, phenyl isocyanate, and $C_2$–$C_{22}$ aliphatic monoisocyanates are examples of materials which are particularly useful to "cap" the polyether. Of course, other organic materials containing reactive groups which react with a hydroxyl group to form an organic end group thereon are also useful in like manner.

Another critical component of this invention is a moderate or high equivalent weight polyahl. The term "polyahy", as used herein, includes any polyfunctional compound having at least two active hydrogen atoms. For the purposes of this invention, an active hydrogen moiety refers to a moiety containing a hydrogen atom which, because of its position in the molecule, displays significant activity according to the Zerewitnoff test described by Kohler in the *Journal of American Chemical Society*, Vol. 49, page 3181 (1927). Illustrative of such active hydrogen moieties are —COOH, —OH, —NH$_2$, —NH—, —CONH$_2$, —SH and —CONH—. Typical polyahls include polyols, polyamines, polyamides, polymercaptans and polyacids.

Of the foregoing polyahls, the polyols are preferred. Examples of such polyols are the polyol polyethers, the polyol polyesters, hydroxy functional acrylic polymers, hydroxyl-containing epoxy resins, polyhydroxy-terminated polyurethane polymers, polyhydroxyl-containing phosphorus compounds and alkylene oxide adducts of polyhydric thioethers including polythioethers, acetals including polyacetals, polyalkylene carbonate polyols, aliphatic and aromatic polyols and thiols including polythiols, ammonia and amines including aromatic, aliphatic and heterocyclic amines including polyamines as well as mixtures thereof. Alkylene oxide adducts of compounds which contain two or more different groups within the above-defined classes may also be used such as amino alcohols which contain an amino group and a hydroxyl group. Also, alkylene oxide adducts of compounds which contain one —SH group and one —OH group as well as those which contain an amino group and a —SH group may be used.

Generally preferred are moderate to high equivalent weight polyols having a functionality of about 2-4, preferably about 2-3. The high molecular weight polyols (i.e. about 1200-8000 molecular weight) generally produce more resilient foams. The moderate (400-1200 molecular weight polyols generally produce the preferred low resiliency foams. Such polyols are well known to be useful in preparing polymer foams. Of course, blends of polyahls having various molecular weights and/or functionalities may be used if the blend has suitable average properties.

The active hydrogen-containing composition of this invention comprises the foregoing critical components. Of these critical components, the moderate or high molecular weight polyahl is the predominant component. Said moderate or high molecular weight polyahl generally comprises at least about 50% of the combined weight of the cell opener and moderate to high molecular weight polyahl.

The cell opener is employed in a minor amount. However, sufficient of the cell opener is used to provide the desired cell-opening. Generally, the polyahl comprises from about 0.1-25, preferably 0.3-10, more preferably about 0.3-2% of the combined weight of the cell opener and polyahl.

To prepare a flexible polymer foam from the active-hydrogen containing composition of this invention, it is reacted with a polyisocyanate in the presence of a blowing agent as described hereinafter.

The blowing agent used in this invention includes material which vaporize or otherwise generate a gas under the conditions encountered in the foaming reaction. Materials which boil under such conditions include low boiling halogenated hydrocarbons such as chlorotrifluoromethane, dichlorodifluoromethane, trichlorofluoromethane, methylene chloride, chloroform, trichloroethane and the like. Suitable materials which react to form a gas under such conditions include water and the so-called azo-blowing agents. Materials which dehydrate to release gaseous water under such conditions, including for example, magnesium sulfate heptahydrate, sodium carbonate decahydrate, sodium phosphate dodecahydrate, calcium nitrate tetrahydrate, ammonium carbonate tetrahydrate and the like are less preferably used as a blowing agent. High surface area particulate solids are also useful blowing agents, as described in U.S. Pat. No. 3,753,933. Preferred are water, halogenated hydrocarbons and mixtures thereof.

A sufficient amount of the blowing agent is used to provide a cellular structure to the polymer. Preferably, sufficent thereof is used to provide the polymer with a density from about 1 to about 12, more preferably about 1.5-4.0 pound per cubic foot. When water is the blowing agent, about 0.25 to about 5 parts by weight thereof are advantageously employed per 100 parts of the polyahls used to prepare the foam. When a halogenated hydrocarbon blowing agent is used, preferably about 2 to 35 parts by weight blowing agent are used per 100 parts of polyahls.

The blowing agent is preferably incorporated into the active hydrogen-containing composition of this invention prior to foam formation, but may be metered separately into the foam formulation, or blended with the polyisocyanate.

In addition to the foregoing components, various optional materials are advantageously employed in the preparation of the foam of this invention.

In addition to the cell opener and moderate or high molecular weight polyahl, a relatively low molecular weight polyahl having an average functionality greater than 2 may be used herein. Such low equivalent weight materials are commonly used in preparing flexible polymer foams in order to provide some crosslinking and to promote gelling in the early steps of the foaming process. The low equivalent polyahl is preferably a polyamine or polyol, with polyols generally being more preferred on the basis of more acceptable reactivity. The equivalent weight of the polyahl is advantageously from about 15 to about 200, preferably about 15-65. Suitable low equivalent weight polyahls include, for example triethanol amine, trimethylol propane, diethanol amine and the like.

The low equivalent weight polyahl is generally present in minor amounts, i.e. not greater than about 50%, preferably not greater than 10%, more preferably about 1-5% of the combined weight of the cell opener, moderate or high molecular weight polyahl, and relatively low molecular weight polyahl.

A catalyst for the reaction of the polyahl(s), and polyisocyanate is generally and preferably employed herein. In addition, when water is used as a blowing agent, a catalyst for its reaction with isocyanate groups in the isocyanate-terminated prepolymer to generate carbon dioxide is also generally employed herein. Ordinarily, the type and the amount of the catalysts employed herein are such that the relative rates of the polymerization and blowing reactions are such that a microcellular foam having substantially uniform cells is obtained. Suitable catalysts for the polymerization reaction include organometal compounds such as organotin, organomercury, or organolead compounds ad described in U. S. Pat. No. 2,846,408. Tertiary amine catalysts such as triethylene diamine, triethyl amine, methyl morpholine, N,N,-dimethyl aminoethyl piperazine and the like are also useful catalysts for the polymerization reaction. Tertiary amine compounds are also effective catalysts for the water blowing reaction. Generally such catalysts are employed in an amount from about 0.002 to 2, preferably 0.01 to 1 parts per 100 parts by weight of polyahls emloyed in the reaction mixture.

A surfactant is normally used in preparing polymer foams according to this invention. Suitable surfactants are well known and their use in preparing polymer foams is well understood. The use of the cell opener of this invention sometimes requires the use of a somewhat greater quantity or a stronger surfactant than is conventionally employed. This is primarily the case in preparing molded foams, since those formulations conventionally employ milder surfactants than are used in preparing slabstock foams. Generally, the surfactants employed in conventional slabstock formulations can be used in this invention to prepare both slabstock and molded foams.

Examples of conventional slabstock surfactants which are useful herein to prepare both slabstock and molded foams include silicones such as BF-2370, BF-2270, B-8014, B8017, B-8200, B-8202, B-8614 and BF-4613, available from Goldschmidt Chemicals; L-5303, L-5305, L-520 and L-540, available from Union Carbide Corporation and DC-190, DC-196, and DC-1372, available from Dow-Corning Corporation.

In addition, other additives such as pigments, fillers, antioxidants, stabilizers, inhibitors and the like are optionally employed herein for their usual purpose.

Such surfactants, catalysts and other additives are typically blended with the active hydrogen-containing components prior to preparing a foam therefrom. However, such components may be metered separately to the foam formulation, or in some instances, blended with the polyisocyanate.

In preparing a polymer foam, the active hydrogen containing composition described herein is reacted with a polyisocyanate in the presence of a blowing agent and, if desired, optional components as described herein. Typically, approximately a stoichiometric amount or a slight deficiency or excess of the polyisocyanate is used, based on the polyahls, polyethers (if reactive with the polyisocyanate) and blowing agent (if reactive with the polyisocyanate). Somewhat greater amounts may be used if in situ trimerization of the polyisocyanate is desired. Generally, an isocyanate index (100 times the ratio of isocyanate groups to active hydrogen atoms) of about 60-125, preferably 80-115 is used. A significantly higher index can be used if trimerization is desired. Lower indices, i.e. 60-100 index, are preferred in preparing low resiliency foams.

Organic polyisocyanates which may be employed include aromatic, aliphatic and cycloaliphatic polyisocyanates as well as combinations thereof. Representative of these types are the diisocyanates such as m-phenylene diisocyanate, tolylene-2,4-diisocyanate, tolylene-2,6-diisocyanate, hexamethylene-1,6-diisocyanate, tetramethylene-1,4-diisocyanate, cyclohexane-1,4-diisocyanate, hexahydrotolylene diisocyanate (and isomers), naphthylene-1,5-diisocyanate, 1-methoxyphenyl-2,4-diisocyanate, diphenylmethane-4,4-diisocyanate, 4,4'-biphenylene diisocyanate, 3.3'-dimethoxy-4,4'-biphenyl diisocyanate, 3,3'-dimethyl-4,4'-diphenyl diisocyanate, and 3,3'-dimethyldiphenylpropane-4,4'-diisocyanate; the triisocyanate such as polymethylene polyphenylisocyanates and tolylene-2,4,6-triisocyanate; and the tetraisocyanates such as 4,4'-dimethyldiphenylmethane-2,2',5,5'-tetraisocyanate. Especially useful due to their availability and properties are tolylene diisocyanate, diphenylmethane-4,4'-diisocyanate and polymethylene polyphenylisocyanates.

Crude polyisocyanates may also be used in the practice of the present invention, such as crude toluene diisocyanate obtained by the phosgenation of a mixture of toluene diamines or crude diphenylmethylene diisocyanate obtained by the phosgenation of crude diphenylmethylenediamine. The preferred undistilled or crude isocyanates are disclosed in U.S. Pat. No. 3,215,652.

Also useful are isocyanate-terminated prepolymers and quasi-prepolymers prepared by reacting an excess of polyisocyanate and a polyahl. Trimer-containing polyisocyanates and prepolymers as are described in U.K. Patent specification No. 1,357,659 are also useful herein.

Foam formation is carried out by blending the diverse components and subjecting such blend to conditions such that the polyisocyanate and active-hydrogen containing components react, and the blowing agent simultaneously releases a gas. Generally, mixing and subsequent reaction can be performed at room temperature or at an elevated temperature less than about 100° C. The particular temperature at which the reaction is optimized depends on the particular polyahls, polyisocyanates, blowing agents and catalysts if any, employed. Such parameters are well understood by those skilled in the art of polyurethane foam production, and such optimization is considered to be routine to such artisans.

Both molded and slabstock foams are readily prepared according to this invention. In preparing molded foam, the reaction mixture, whether premixed or blended in situ, is allowed to react and rise inside a closed mold according to well understood processes. Molded foams prepared according to this invention include shaped articles, pour-in-place foams, skinned and unskinned foams.

The foam of this invention is useful in preparing molded dashboard and interior parts for automobiles, energy absorbing articles and the like. Preferably, the foam of this invention is a "low resiliency" foam, i.e. one which exhibits a ball rebound of 15% or less as measured by the percent rebound ball rebound resiliency test described in ASTM D 3754 Test H. Such low resiliency foams are especially useful as impact or sound absorbers.

The following examples are provided to illustrate the invention but are not intended to limit the scope thereof. All parts and percentages are by weight unless otherwise indicated.

Three standard foam formulations are used in Examples 1-3. The compositions of these formulations are set out in Table I.

TABLE I

| Component | Parts By Weight | | |
|---|---|---|---|
| | Formulation A | Formulation B | Formulation C |
| Toluene diisocyanate[1] | Index as indicated in the particular examples | | |
| Triol[2] | 100 | 100 | 100 |
| Trichlorofluoromethane | 10 | 0 | 10 |
| Water | 0 | 1.2 | 1.0 |
| Surfactant[3] | 1.0 | 1.0 | 1.2 |
| Amine Catalyst[4] | 0.25 | 0 | 0 |
| Dimethylethylamine | 0 | 0.5 | 0.5 |
| Amine Catalyst[5] | 0 | 0.3 | 0.3 |
| Triethanol amine | 1.0 | 0 | 0 |
| Tin catalyst[6] | Variable | Variable | Variable |
| Cell opener | Variable | Variable | Variable |

[1]80/20 mixture of 2,6- and 2,4-isomers
[2]A 700 molecular weight glycerine initiated polypropylene oxide triol.
[3]Silicone surfactant available commercially as BF-2370 from Goldschmidt Chemical Corporation.
[4]Niax A-1, available from Union Carbide Corporation.
[5]33LV, available from Air Products and Chemicals, Inc.
[6]T-9, available from M & T Chemicals, Inc.

The following general procedure is used to prepare all foam samples in Examples 1-3. All ingredients except the isocyanate are blended for about 37 seconds in a suitably-sized container to form a premix. If water is present in the formulation (Formulations B and C) the tin catalyst is added after the other components (except TDI) are stirred together for 30 seconds. The TDI is stirred into the premix at room temperature for about 5 seconds and the resulting reaction mixture is poured into a paper container and allowed to rise. The foaming mixture is watched to observe any "blow off", a release of gas which indicates the opening of the cells. After the reaction is complete, the top of the foam is cut off and a one-inch thick slice is cut to measure density.

Larger foam samples are prepared by blending all additives (except TDI and, if water is present, the tin catalyst) for 30 seconds using a pin mixer operated at 1500 rpm. If water is present, the tin catalyst is added after the first 25 seconds of mixing. Then the TDI is stirred into the premix for 4 seconds at 2500 rpm. The reaction mixture is poured into a 15"×15"×9.5" box and allowed to free rise. The reaction is observed to see if a "blow-off" occurs. After the reaction is complete, 13"×13"×4" samples are cut for testing.

In either instance, good cell opening is indicated by a "blow-off" during forming,, and a lower foam density. Poor cell opening is indicated by a lack of a "blowww-off", a tight cell structure higher form density, and shrinkage or pruning of the foam. The cell structure and primary shrinkage are evaluated by cutting a 3"×3"×1" section of the foam. Bowing of the sides of this section indicates inadequate cell opening.

EXAMPLE 1

Various cell openers are evaluated using Formulation A at a 95 isocyanate index. Each cell opener is evaluated at different levels of use in order to determine the minimum effective amount. An effective amount of cell opener is that amount at which a blow-off is seen, the product foam has an open-celled structure and the foam does not exhibit substantial shrinkages or pruning. Cell opener Sample Nos. 1-5 are n-butanol initiated poly(1,2-butylene oxide) monols having number average molecular weights and viscosities as indicated in Table II. Comparative Samples No. C-1 to C-4 are polybutene polymers having number average molecular weights and viscosities as indicated in Table II.

TABLE II

| Sample No. | Cell Opener[1] Type | $M_n^2$ | Viscosity[3] (csk) | Minimum Effective Level (parts) |
|---|---|---|---|---|
| 1 | PBO | 1385 | 20 | 11 |
| 2 | PBO | 4184 | 107 | 0.6 |
| 3 | PBO | 5133 | 124 | 0.4 |
| 4 | PBO | 5334 | 150 | 0.3 |
| 5 | PBO | 7037 | 204 | 0.3 |
| C-1 | PB | 460 | 19 | 1.5 |
| C-2 | PB | 610 | 48-56 | 1.3 |
| C-3 | PB | 750 | 109-125 | 2.0 |
| C-4 | PB | 920 | 196-233 | 2.0 |

[1]PBO = poly (1,2-butylene oxide)
PB = poly(isobutylene)
[2]$M_n$ = number average molecular weight
[3]Measured by a Kinematic viscometer at 210° F.

The foregoing data indicate the generally greater effectiveness, per unit weight, of the cell opener employed in this invention. Except for Sample No. 1, in which a very low viscosity PBO is used, all samples employing PBO require substantially smaller amounts thereof than samples employing polybutene. Also of interest is the effect of molecular weight (and viscosity) on the effectiveness of PBO. A greater molecular weight is seen to reduce the required amount of cell opener when PBO is used. However, the opposite is seen to be true with respect to the polybutene cell openers.

EXAMPLE 2

In this example, poly(1,2-butylene oxide) polymers having varying functionalities (0-3) are evaluated in Formulation A at a 95 index. The zero functional PBO is prepared by reacting equimolar quantities of a methanol initiated PBO and phenylisocyanate for 8 hours at 100° C. in the presence of a tin catalyst. The composition of the cell opener employed in the various samples, as well as the minimum effective level of use, is indicated in Table III.

EXAMPLE 3

In this example, a poly(1,2-butylene oxide) monol having a molecular weight of 5334 is evaluated in Formulation C of a 95 index. A good "blow-off" is seen and resulting foam exhibits no shrinkage.

TABLE III

| Sample No. | Initiator[1] | Functionality | $M_n^2$ | Viscosity[3] (cks) | Minimum Effective Level (parts) |
|---|---|---|---|---|---|
| 6 | n-BuOH | 1 | 4184 | 107 | 0.6 |
| 7 | n-BuOH | 1 | 5133 | 124 | 0.4 |
| 8 | n-BuOH | 1 | 7037 | 204 | 0.3 |
| 9 | MeOH | 1 | 2418 | 52 | 3.0 |
| 10 | $C_{12-16}$ Alcohols | 1 | 2464 | 52 | 2.0 |
| 11 | MeOH | 0 | 2416 |  | 0.5 |
| 12 | DPG | 2 | 5600 |  | 1.0 |
| 13 | Glycerine | 3 | 4661 |  | <0.5 |
| 14 | Glycerine | 3 | 6300 |  | <0.5 |

[1] n-BuOH - n-butanol; MeOH - methanol; $C_{12-16}$ alcohols refer to a mixture of $C_{12}$-$C_{16}$ alcohols sold as Alfol 1216 by Conoco; DPG = dipropylene glycol
[2] $M_n$ = number average molecular weight
[3] Measured with a Kinematic viscosometer at 210° F.

EXAMPLE 4-7

In Examples 4-7, molded low resiliency foams are prepared from the formulations described in Table IV.

TABLE IV

| | Parts By Weight | | | |
|---|---|---|---|---|
| Component | Example 4 | Example 5 | Example 6 | Example 7 |
| Toluene diisocyanate (TDI) | 113 index | 95 index | 0 | 0 |
| Polymeric MDI[1] | 0 | 0 | 95 index | 85 index |
| Polypropylene oxide triol[2] | 100 | 0 | 100 | 0 |
| EO capped triol[2] | 0 | 100 | 0 | 100 |
| Water | 2.0 | 2.0 | 2.0 | 2.0 |
| Trichlorofluoromethane | 0 | 0 | 0 | 5 |
| BF 2370 surfactant[4] | 1.3 | 0 | 1.3 | 0.7 |
| L5340 surfactant[5] | 0 | 1.4 | 0 | 0.7 |
| Amine Catalyst[6] | 0.3 | 0.3 | 0.3 | 0.3 |
| dimethylethylamine | 0.5 | 0.5 | 0.5 | 0.5 |
| diethanolamine | 2.0 | 2.0 | 2.0 | 2.0 |
| tin catalyst[7] | 0.15 | 0.10 | 0.075 | 0.075 |
| Cell opener | 1.0 | 1.0 | 1.0 | 1.0 |

[1] A 129 equivalent weight polyphenol methane polyisocyanate containing 32.6% by weight NCO, available from Upjohn
[2] A 900 MW polypropylene oxide triol
[3] A polypropylene oxide triol capped with 15% ethylene oxide to provide a final molecular weight of 700.
[4] A silicone surfactant available from Goldschmidt Chemical Corporation
[5] A silicone surfactant available from Union Carbide Corporation
[6] 33 LV, available from Air Products and Chemicals, Inc.
[7] T-9, available from M & T Chemicals, Inc.

The molded foams are prepared by hand mixing all components except the polyisocyanate for about 30 seconds, then blending the polyisocyanate into the reaction mixture for about 4 seconds, and pouring the mixture into a 6"×6"×2" mold which has been preheated to 140° F. The mold is also previously treated with a mold release agent. The mold is closed and placed into a 140° F. oven for 6-8 minutes. The molded foam is then immediately removed from the mold. In all cases, a low resiliency foam is obtained which exhibits excellent dimensional stability.

What is claimed is:

1. An active hydrogen-containing composition comprising
   (a) a major portion of a moderate to high molecular weight polyahl which is not a polymer of an α,β-alkylene oxide having at least 4 carbon atoms, and
   (b) a minor portion of a polymer of an α,β-alkylene oxide having at least 4 carbon atoms, which polymer has a molecular weight of at least about 500.

2. The composition of claim 1 wherein component (b) comprises a polymer of a $C_4$-$C_{12}$ alkylene oxide or styrene oxide.

3. The composition of claim 2 wherein component (b) contains an average of about 0 to about 8 hydroxyl groups per molecule.

4. The composition of claim 3 wherein component (b) comprises a polymer of butylene oxide having a functionality of about 1 and a molecular weight of at least 1500.

5. The composition of claim 1 or 4 further comprising a surfactant, a blowing agent and at least one of a tertiary amine catalyst and an organometallic catalyst.

6. The composition of claim 5 wherein component (a) comprises a polyether polyol having a molecular weight of about 450-12,000 and a functionality from about 2-4.

7. The composition of claim 6 further comprising (c) a relatively low equivalent weight polyahl.

8. The composition of claim 7 wherein said relatively low equivalent weight polyahl comprises a polyol having an equivalent weight from about 25–250, and a functionality from about 3–8.

9. The composition of claim 8 wherein component (b) comprises from about 0.1–10% of the combined weight of components (a), (b) and (c).

10. The composition of claim 9 wherein component (b) comprises a polymer of butylene oxide having a molecular weight of about 1500–10,000, a functionality of about 1 and comprises from about 0.1–1% of the combined weight of components (a), (b) and (c).

* * * * *